United States Patent [19]

Kubo et al.

[11] 4,428,258

[45] * Jan. 31, 1984

[54] TRANSMISSION CONTROL SYSTEM WITH MODIFIED BACK PRESSURE ACCUMULATOR

[75] Inventors: Seitoku Kubo, Toyota; Koujiro Kuramochi, Okazaki; Tatsuo Kyushima, Toyota, all of Japan

[73] Assignee: Toyota Jidosha Kogyo Kabushiki Kaisha, Toyota, Japan

[*] Notice: The portion of the term of this patent subsequent to Jul. 26, 2000 has been disclaimed.

[21] Appl. No.: 210,223

[22] Filed: Nov. 25, 1980

[30] Foreign Application Priority Data

Mar. 27, 1980 [JP] Japan .................................. 55-39536

[51] Int. Cl.³ ............................................ B60K 41/24
[52] U.S. Cl. ....................................... 74/867; 74/865
[58] Field of Search ................. 74/861, 863, 865, 867, 74/868, 869

[56] References Cited

U.S. PATENT DOCUMENTS

| 3,908,485 | 9/1975 | Miyauchi | 74/863 |
| 4,056,991 | 11/1977 | Sakai | 74/863 |
| 4,125,038 | 11/1978 | Hilamatsu | 74/865 |
| 4,308,765 | 1/1982 | Iwanaga | 74/865 |
| 4,324,156 | 4/1982 | Iwanaga | 74/867 |

FOREIGN PATENT DOCUMENTS

| 2450584 | 5/1975 | Fed. Rep. of Germany | 74/861 |
| 52-14174 | 2/1977 | Japan | 74/867 |

Primary Examiner—Kenneth Dorner
Assistant Examiner—D. Wright
Attorney, Agent, or Firm—Stevens, Davis, Miller & Mosher

[57] ABSTRACT

A fluid pressure control system for controlling an automatic transmission which includes a gear transmission mechanism and several fluid pressure actuated friction engaging mechanisms, selective engagement of which provides various speed stages from the gear transmission mechanism. A line pressure control valve produces a line pressure which increases from a base pressure by an amount proportional to engine load. A throttle pressure control valve produces a throttle pressure which is proportional to engine load. A shift valve selectively switches supply of line pressure to one of the friction engaging mechanisms via a passage, according to the operational conditions of the vehicle. A back pressure accumulator is connected to an intermediate part of the passage. Back pressure is supplied to a back pressure chamber of the accumulator by a fluid pressure control means which receives supply of line pressure and outputs a pressure which, when engine load is medium, is approximately equal to line pressure, but which, when engine load is small or is large, is substantially lower than line pressure. Thereby, the performance of the accumulator for cushioning over abrupt engagement of the friction engaging mechanism is more suitably tailored to the torque characteristics of the engine of the vehicle, and gear shift shock is accordingly reduced.

1 Claim, 4 Drawing Figures

TRANSMISSION CONTROL SYSTEM WITH MODIFIED BACK PRESSURE ACCUMULATOR

BACKGROUND OF THE INVENTION

The present invention relates to a fluid pressure control system for controlling an automatic transmission which is used in an automotive vehicle, and, more particularly, relates to an improvement in such a fluid pressure control system for more suitably conforming the characteristics of the shifting performance of the transmission to the torque output characteristics of the engine of the vehicle.

Automatic transmissions for automotive vehicles are well known. They typically include a gear transmission mechanism and several friction engaging mechanisms such as clutches and brakes. By the selective engagement and disengagement of the friction engaging mechanisms, which are typically actuated by fluid pressure, various speed stages are made available from the gear transmission mechanism.

Various fluid pressure control systems are known for providing actuating fluid pressures for the friction engaging mechanisms. Typically, such a fluid pressure control system includes a throttle fluid pressure control valve, which produces a throttle fluid pressure which varies linearly according to a quantity representing the load on the engine of the vehicle, which is usually, in the case of an engine fitted with a carburetor, the opening amount of the throttle valve of the carburetor; a governor fluid pressure control valve which produces a governor pressure which varies linearly according to the road speed of the vehicle; and at least one shift valve, which shifts according to a balance between the throttle pressure and the governor pressure, and thereby selectively supplies fluid pressure to, and exhausts fluid pressure from, at least one of the aforesaid plurality of friction engaging mechanisms.

Such a friction engaging mechanism generally comprises two groups of friction plate elements, these two groups being mutually interleaved, and being respectively connected to elements of the gear transmission mechanism and/or the housing thereof which are mutually rotatable. Further, a fluid pressure activated servo device is typically provided, supply of operating fluid pressure to which squeezes together the two groups of friction plate elements so that they engage together and transmit torque between the aforesaid mutually rotatable parts of the transmission. In more detail, when the servo device is not compressing together the two groups of friction units, they are able substantially freely to rotate with respect to one another; and, as operating fluid pressure supplied to the servo device progressively increases, the groups of friction plate elements are progressively more and more strongly squeezed together, and accordingly their maximum torque transmitting ability progressively increases, in approximately direct proportion to the magnitude of the operating fluid pressure provided to the servo device. Finally, when the operating fluid pressure provided to the servo device reaches a sufficiently high level, the two groups of friction plate elements are locked together, and are securely engaged together, so that they cannot rotate with respect to one another.

A major problem with regard to prior art fluid pressure control systems has been the ensuring of smooth engagement of such a friction engaging mechanism, in order for the transmission to change speeds without producing any transmission shift shock, over a wide range of operating conditions of the automatic transmission. In more detail, a particular speed shift may occur at various different vehicle road speeds and at various different engine load conditions, i.e., various different throttle openings. Generally speaking, the greater is the load upon the engine of the vehicle during shifting of transmission speed stage, the greater will be the torque which is required to be handled by the friction engaging mechanism which is being engaged. Accordingly, it has been practiced for the transmission line fluid pressure, which is typically the source of fluid pressure which is selectively switched by the aforementioned shift valve and which is output as an actuating fluid pressure for the servo device of the friction engaging mechanism, to be linearly increased according to increase of the load on the engine of the vehicle. In more detail, it has been practiced for the line fluid pressure to be at a predetermined base level when the load on the engine is zero or very low, and to be increased from this base level by an amount substantially proportional to the load on the engine. According to this, the actuating fluid pressure for the servo device of the friction engaging mechanism, which is this line pressure as controlled by the shift valve, is thereby also increased according to increase of the load upon the engine, and thereby is higher when the servo device of the friction engaging mechanism is required to control a higher torque.

In order smoothly to mediate the shifting of gear shift stage of the transmission, and in order to make the engagement and the release of a friction engaging mechanism more gradual and more smooth, it is common in the prior art to connect a back pressure type accumulator to an intermediate portion of the fluid passage which conducts the actuating fluid pressure from the above-mentioned shift valve to the servo device of the friction engaging mechanism. Generally speaking, such an accumulator comprises a cylinder and a piston reciprocating within the cylinder. A chamber defined on the one side of the piston serves as a fluid accumulator chamber, and is communicated to said intermediate portion of said passage, so as temporarily to accumulate fluid therefrom in order to condition sudden surges of fluid pressure therein; and a chamber defined on the other side of the piston serves as a back pressure chamber, and is connected to a source of fluid pressure such as line fluid pressure or throttle fluid pressure, which thus elastically supports the piston against the pressure in said passage which is communicated to the accumulator chamber.

For the friction engaging mechanism to be smoothly engaged and disengaged under the mediating effect of such a back pressure type accumulator as connected to an intermediate portion of the fluid passage supplying operating pressure to the servo device of the friction engaging mechanism, the fluid pressure supplied to the back pressure chamber of the accumulator should be suited to the magnitude of the torque required to be controlled by the friction engaging mechanism. That is to say, if the engine of the vehicle is producing a high torque, which is generally the case when the load on said engine is high, it is desirable that the back pressure supplied to the back pressure chamber of the accumulator should be higher than when the engine is only producing a medium or low torque. In the prior art, the back pressure supplied to the back pressure chamber of such an accumulator has typically been line fluid pressure or throttle fluid pressure, both of which, as explained above, have increased linearly with the load upon the engine of the vehicle. However, the torque delivered by the engine of the vehicle does not increase strictly linearly with the load. In fact, the graph of torque against load for a typical internal combustion engine is convex upwards, i.e., the rate of increase of torque with increase of load decreases according to increasing load. This difference in variation characteristic with respect to load on the engine, between the line pressure or the throttle pressure and the torque delivered by the engine, is quite significant, and has made it impossible in the prior art effectively to conform the fluid pressure supplied to the back pressure chamber of such an accumulator to the torque which is required to be controlled by the friction engaging mechanism whose engagement is mediated by such an accumulator. In other words, if the back pressure provided to the back pressure chamber of such an accumulator is arranged to be properly in conformity with the torque being delivered by the engine in the region of a particular engine load which is required to be controlled, then in other ranges of engine load this conformity between back pressure and controlled torque will no longer be the case. In fact, in the prior art, it has been impractical to conform the back pressure supplied to the back pressure chamber of a fluid accumulator for mediating the engagement of a friction engaging mechanism to the torque required to be controlled by the friction engaging mechanism, over a wide range of engine load.

SUMMARY OF THE INVENTION

Therefore, in view of the above outlined difficulty, it is an object of the present invention to provide an improved fluid pressure control system for an automatic transmission incorporating a back pressure type accumulator of the general type described above, in which the back pressure supplied to the back pressure chamber is not the same as the line pressure or as the throttle pressure, but is modified therefrom, and is so conformed, with regard to variation of engine load, to the torque produced by the engine of the vehicle, that, over a wide range of engine load, smooth engagement and disengagement of the friction engaging mechanism whose operation is mediated by the accumulator is effected, and thereby to provide smooth operation of the automatic transmission without undue gear shift shock, over a wide range of load on the engine of the vehicle.

It is a further object of the present invention to provide such a fluid pressure control system in which the back pressure for the back pressure chamber of the accumulator is simply produced by simply modifying line pressure by a relatively cheap and easy to manufacture hydraulic fluid pressure device.

It is a further object of the present invention to provide such a fluid pressure control system for an automatic transmission in which the device producing the aforesaid modified back pressure for the back pressure chamber of the accumulator is reliable during operation and has a long service life.

According to the present invention, these and other objects are accomplished by, for an automatic transmission for an engine powered vehicle, comprising a gear transmission mechanism and a plurality of fluid pressure actuated friction engaging mechanisms, a plurality of speed stages being provided by said gear transmission mechanism according to selective actuation of said friction engaging mechanisms; a fluid pressure control system comprising: (a) a line fluid pressure control valve which produces a line fluid pressure which increases from a predetermined base pressure approximately proportionally to a quantity representative of engine load; (b) a throttle fluid pressure control valve which produces a throttle fluid pressure which is approximately proportional to said quantity representative of engine load; (c) a shift valve which receives supply of said line pressure and which selectively supplies it according to the operational conditions of the vehicle; (d) a fluid pressure passage which receives said selective supply of fluid pressure from said shift valve and which conducts it to one of said friction engaging mechanisms; (e) an accumulator comprising an accumulator chamber and a back pressure chamber, the accumulator chamber being connected so as to accumulate fluid from an intermediate point on said passage; and (f) a means for controlling fluid pressure, which receives supply of said line pressure, and which outputs to said back pressure chamber of said accumulator an output fluid pressure which, when said quantity representative of engine load is in the small range, or is in the large range, is substantially lower than said line pressure, but which, when said quantity representative of engine load is in the medium range, is approximately equal to said line pressure; whereby the back pressure chamber of said accumulator is provided with a back pressure, the variation of which with respect to engine load is well in agreement with the variation of engine torque with respect to engine load; and whereby the reduction of said back pressure below line pressure, when engine load is in the small or in the large range, ensures that the engagement of said one friction engaging mechanism is performed over a longer time interval than if such reduction were not performed, so that the occurence of shift shock and transmission jerk during shifting of gear speed stage is reduced.

Further, according to a particular aspect of the present invention, said fluid pressure control means may comprise: a first fluid pressure modulation valve, which is supplied with the throttle pressure, and which outputs a throttle modulator fluid pressure which is the same as throttle pressure when the throttle pressure is below a first predetermined level, and is equal to said first predetermined level when the throttle pressure is greater than said first predetermined level; and a second fluid pressure modulation valve, which receives said line fluid pressure and said throttle modulator fluid pressure, and which produces, as said output of said fluid pressure control means, a fluid pressure which, when the line pressure is lower than a second predetermined pressure, is less than line pressure, but increases faster with increasing engine load than does said line pressure; when said line pressure is between said second predetermined pressure and a third predetermined pressure, is substantially equal to line pressure; and, when line pressure is greater than said third predetermined pressure, is substantially equal to said third predetermined pressure; whereby the overall shape of the graph of said output fluid pressure of said fluid pressure control means as the ordinate, and engine load as the abscissa, is convex upwards; whereby the back pressure chamber of said accumulator is provided with a back pressure, the variation of which with respect to engine load is of the same general nature as is the variation of engine torque with respect to engine load; and, further, as a constructional aspect of the present invention, said first fluid pressure modulation valve may comprise: a first bore; a first valve element slidably mounted within said first bore; a first input port opening in said first bore; a first output port, opening in said first bore, communication of which with said first input port is established when said first valve element is positioned beyond a first point in a first direction within said first bore, and communication of which to said first input port is interrupted when said first valve element is positioned beyond said first point in the direction opposite to said first direction within said first bore; a first compression coil spring biasing said first valve element in said first direction; and a first biasing chamber, supply of fluid pressure to which biases said first valve element in the direction opposite to said first direction; said throttle pressure being supplied to said first input port, and said throttle modulator fluid pressure being taken out from said first output port and also being fed therefrom to said first biasing chamber; and said second fluid pressure modulation valve may comprise: a second bore; a second valve element slidably mounted within said second bore; a second input port opening in said second bore; a second output port, opening in said second bore, communication of which with said second input port is established when said second valve element is positioned beyond a second point in a second direction within said second bore, and communication of which to said second input port is interrupted when said second valve element is positioned beyond said second point in the direction opposite to said second direction within said second bore; a second compression coil spring biasing said second valve element in said second direction; a second biasing chamber, supply of fluid pressure to which biases said second valve element in the direction opposite to said second direction; and a third biasing chamber, supply of fluid pressure to which biases said second valve element in said second direction; said line pressure being supplied to said second input port, said throttle modulator fluid pressure being supplied to said third biasing chamber, and said output fluid pressure of said fluid pressure control means being taken out from said second output port and also being fed therefrom to said second biasing chamber.

According to such a construction, because the novel pressure modifying device incorporating the first pressure modulator valve and the second pressure modulator valve is fitted so as to modify the back pressure supplied to the back pressure chamber of the accumulator, this back pressure is suitably conformed to the magnitude of the torque which is being delivered by the engine of the vehicle, over a wide range of engine load, as will be seen hereinafter. Accordingly, transmission shift shock is effectively reduced in a transmission which incorporates this fluid pressure control system.

BRIEF DESCRIPTION OF THE DRAWINGS

The present invention will become more fully understood from the following description of a preferred embodiment thereof, which is to be taken in conjunction with the accompanying drawings. It should be clearly understood, however, that the description of the preferred embodiment, and the drawings, are all of them provided purely for the purposes of illustration and exemplification only, and are in no way to be taken as limitative of the scope of the present invention. In the drawings.

DESCRIPTION OF THE PREFERRED EMBODIMENTS

The present invention will now be described in terms of a preferred embodiment thereof, and with reference to the accompanying drawings. However, first the shortcomings of the typical prior art back pressure accumulator system of the sort outlined above will be explained more particularly, with reference to FIGS. 1 and 2.

Figure 1:
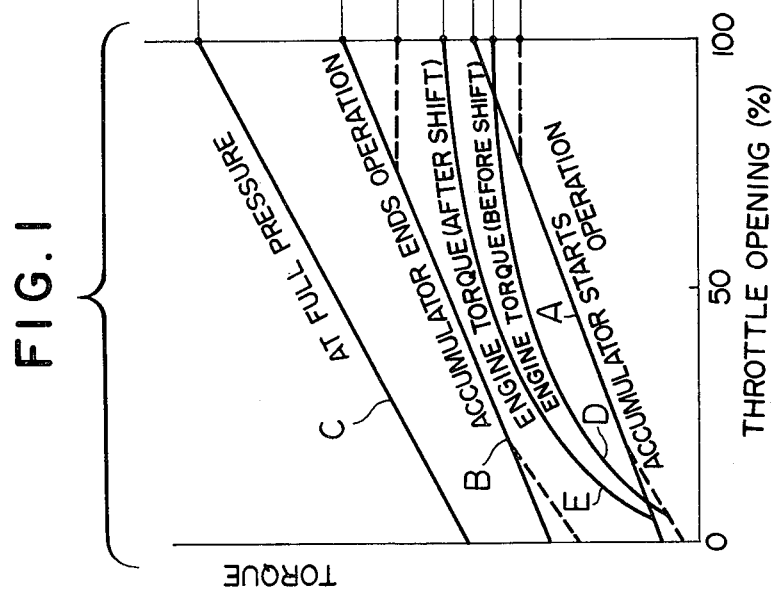
FIG. 1 is a graph, in which engine load is the abscissa, and torque is the ordinate, illustrating changes of the torque transmission ability of a friction engaging device, and the changes in engine output torque, with respect to load on an internal combustion engine.

As has been previously explained, it is conventional for the line pressure to be equal to a fundamental or base pressure, when the load on the engine is substantially zero, and to increase linearly therefrom in proportion to increased load upon the engine. In the case, which is usual, that this line pressure is supplied, via a switching valve as previously described, as an operating pressure for a friction engaging mechanism, then the torque transmission ability of the friction engaging mechanism will also increase linearly with the engine load from a certain base value. In FIG. 1, the solid line A shows the relationship between the load on the engine and the torque transmission ability of the friction engaging mechanism at the time when the back pressure accumulator just commences its operation. The solid line B shows the relationship between the load on the engine and the torque transmission ability of the friction engaging mechanism at the time when the accumulator has just finished its operation. Further, the solid line C shows the torque transmitting ability of the friction engaging mechanism when this friction engaging mechanism is completely engaged, i.e. when its actuating fluid pressure has risen to the some value as the line pressure, with reference to engine load. Thus, it is seen that this line C is a straight line, because of the above-mentioned linear relationship of the line pressure to the engine load.

On the other hand, the lines D and E show the relationship of the torque delivered by the engine to the load on the engine. In more detail, the line D shows the relationship of the torque delivered by the engine to the engine load, before the automatic transmission has changed gear; and, similarly, the line E shows the relationship of the torque delivered by the engine to the engine load, after the automatic transmission has changed gear, i.e., in this case, after an upshift, when the rotational speed of the engine has decreased.

Upon consideration of the shapes of these solid lines, which represent the performance of a prior art fluid pressure control system, it will be clear that, because the engine torque lines D and E are convex upwards, while the torque transmission ability lines A, B and C are straight, therefore the performance of torque transmission ability of the friction engaging mechanism with respect to engine load is not well suited to the torque characteristic of the engine with respect to engine load. This is more particularly illustrated in FIG. 2, which is an illustration showing the particular case when engine load is maximum or 100%, and which shows torque transmission ability of the friction engaging mechanism, and engine torque, against time, during an upshift. Of course, because the operating fluid pressure of the friction engaging mechanism is substantially proportional to the torque transmitting ability thereof, the ordinate in FIG. 2 may be considered as indicating this operating fluid pressure, equally.

It has been assumed, for this example, that the operational characteristics of the back pressure accumulator, and of the system as a whole, have been so arranged that at an engine load value of approximately 50% the upshift occurs smoothly; in other words, the performance of the back pressure accumulator has been tailored to this value of engine load. In the case shown in FIG. 2, therefore, which corresponds to an engine load of 100%, the operational characteristics of the back pressure accumulator are like the solid lines AA, BB, and CC. The solid line AA leads from a start or zero time, at which supply of operating fluid pressure to the friction engaging mechanism is commenced, relatively steeply upwards to the point a at which the accumulator starts to function. After this value of fluid pressure (or, correspondingly, of torque transmission ability) is attained, the operating fluid pressure of the friction engaging mechanism increases relatively gently with time, due to the operation of the accumulator, as shown by the solid line BB. At the point b, the operation of the accumulator stops, because the accumulator is full, and thencefrom the operating fluid pressure of the friction engaging mechanism again rapidly increases, as shown by the solid line CC, to the point c, at which the friction engaging mechanism is fully engaged. This line represents the torque transmitting ability of the friction engaging mechanism. However, since before the gear shift the torque delivered by the engine is as shown by the point d on the line AA, at this point the friction engaging mechanism commences to engage, before the accumulator has started to operate, and accordingly a gear shift shock is produced. As the gear stage shifts, the torque of the engine increases, as has been mentioned above, to the value corresponding to the point e on the line BB, because the rotational speed of the engine increases; but this point, however, is fairly close to the point d, separated therefrom by the time interval $t_1$; and accordingly this length of time between the time point when the friction engaging mechanism starts to engage to the time point when it engages fully is relatively short. Accordingly, it will be seen that the operation of the accumulator is not being fully utilized to good advantage, in the case shown in FIG. 2 when engine load is at or near 100%. In other words, although the characteristics of the system are well suited for the case when engine load is approximately 50%, at high load conditions the system will not work smoothly. Similarly, at low load conditions, equally, the system will not function properly.

Figure 3:
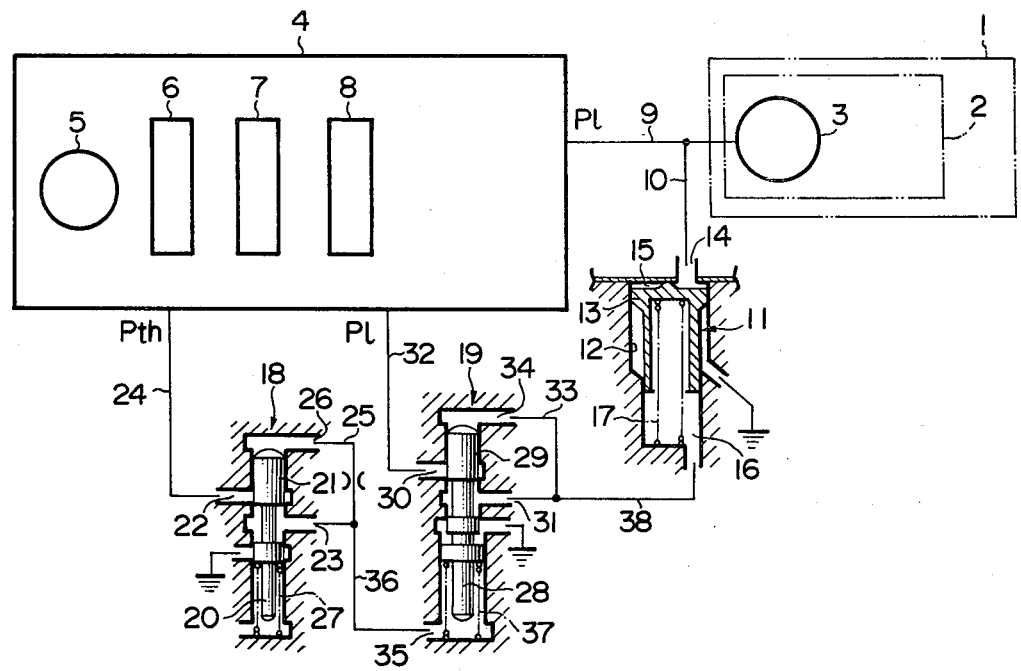
FIG. 3 is a schematic view, partly in block diagram form, showing a preferred embodiment of the fluid pressure control system for an automatic transmission according to the present invention.

In FIG. 3, there is shown a somewhat schematic view of a fluid pressure control circuit for an automatic transmission which is a preferred embodiment of the present invention. In this figure, only some of the parts of the fluid pressure control system are shown in concrete form, and some of the parts thereof which are of constructions which are per se well known are shown in a block diagram form, for the purposes of simplicity of description.

In the figure, the reference numeral 1 denotes an automatic transmission for use in a vehicle, and the construction of this automatic transmission is per se well known. This automatic transmission comprises a gear transmission mechanism 2, of which the construction is also per se well known. This gear transmission mechanism 2 comprises a plurality of fluid pressure actuated friction engaging mechanisms, a particular one of which is denoted by the reference numeral 3. A plurality of speed stages are available from the gear transmission mechanism 2 for the automatic transmission 1, according to selective actuation of these friction engaging mechanisms. However, in the following only the engagement of the friction engaging mechanism 3 will be discussed, although the present invention will of course be equally applicable to all such friction engaging mechanisms comprised within the gear transmission mechanism 2.

The friction engaging mechanism 3 is provided with operating fluid pressure through a fluid conduit 9 from a fluid pressure control circuit 4. The various parts of the fluid pressure control circuit 4 are of constructions which are per se well known, and include a fluid pressure pump 5, a line fluid pressure control valve 6, a throttle fluid pressure control valve 7, and a speed shift valve 8.

The fluid pressure pump 5 produces pressurized hydraulic fluid for the line pressure control valve 6 and for the throttle pressure control valve 7, and also for a governor fluid pressure control valve which is not shown in the drawing, but which is comprised within the fluid pressure control circuit 4. The line fluid pressure control valve 6 regulates this pressure to produce a line fluid pressure which is equal to a base or fundamental fluid pressure when the load on the engine (not shown) of the vehicle is zero or low, and which increases linearly from this base value according to increase in engine load. That is to say, the line fluid pressure control valve 6 produces a line pressure Pl which varies with respect to load as shown by the solid line L in FIG. 4, which is a graph of fluid pressure against engine load.

The throttle fluid pressure control valve 7 produces a throttle fluid pressure which is substantially proportional to engine load. In other words, the performance of the throttle pressure with respect to engine load is shown exemplarily by the solid line T in FIG. 4.

The shift valve 8, according to a per se well known fashion of operation, is supplied with the throttle fluid pressure and the aforesaid governor fluid pressure produced by the governor fluid pressure control valve which is not shown, and shifts to and fro according to a balance between these pressures. The shifting to and fro of the shift valve 8 controls a supply of operating fluid pressure to the friction engaging mechanism 3 through a fluid conduit 9. This operating fluid pressure is line pressure or a pressure which is equivalent to line pressure.

To an intermediate portion of the fluid conduit 9 there is connected an accumulator 11, via a fluid conduit 10. In the accumulator 11, a piston 13 reciprocates within a bore 12 which is formed within a housing. On the upper side in the drawing of the piston 13 there is defined an accumulator chamber 15, and on the lower side in the drawing of the piston 13 there is defined a back pressure chamber 16. A port 14 to the accumulator chamber 15 is connected to the fluid conduit 10. The piston 13 is biased in the upwards direction in the drawing by a compression coil spring 17. Fluid pressure is supplied to the back pressure chamber 16 of the accumulator 11 through a fluid conduit 38 from a back pressure regulation circuit system which will hereinafter be described. The construction of this back pressure accumulator 11 is per se well known.

The reference numerals 18 and 19 denote, respectively, a first pressure modulator valve and a second pressure modulator valve.

The first pressure modulator valve 18 comprises a valve element 20, which reciprocates upwards and downwards in the drawing within a bore formed in a housing, and which is biased in the upwards direction in the figure by a compression coil spring 27. Likewise, the second pressure modulator valve 19 comprises a valve element 28, which reciprocates upwards and downwards in the drawing within a bore formed in a housing, and which is biased in the upwards direction in the figure by a compression coil spring 37.

The throttle fluid pressure Pth is fed from the fluid pressure control circuit 4, via a fluid conduit 24, to an input port 22 of the first pressure modulator valve 18. As the valve element 20 moves upwards and downwards within its bore, the land portion 21 thereof controls the amount of communication between the input port 22 and an output port 23 of the first pressure modulator valve 18. The fluid pressure appearing at the output port 23 is fed back, via a throttling element and a fluid conduit 25, to a biasing port 26 at the upper end in the drawing of the first pressure modulator valve 18, whence it enters a chamber where it bears on the upper end of the valve element 20. Thus, the valve element 20 is driven to and fro within its bore under the opposing actions of this force on its upper end in the drawing due to this fed back fluid pressure, and the force due to the compression coil spring 27. Further, when the valve element 20 moves a certain distance downwards in the drawing, the land portion 21 thereof cuts off communication between the input port 22 and the output port 23, and accordingly the pressure at the output port 23 immediately drops.

Figure 4:
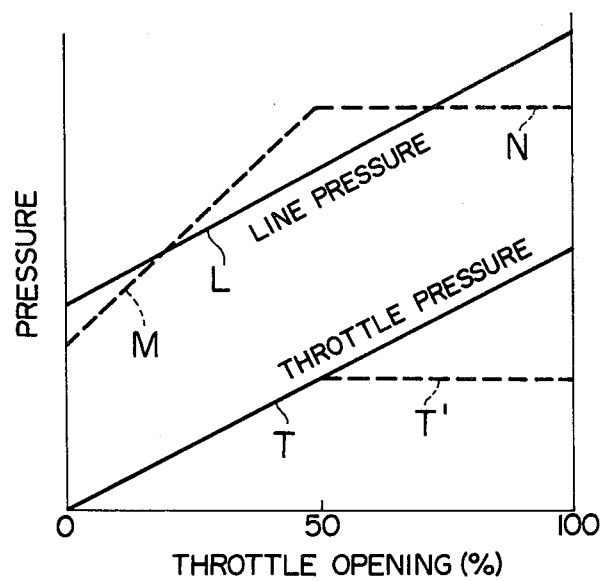
FIG. 4 is a graph, in which engine load is the abscissa and hydraulic fluid pressure is the ordinate, showing the performance with respect to engine load of a throttle pressure and of a line pressure, both in the prior art, and according to the present invention.

Accordingly, with this construction, when the throttle fluid pressure Pth is less than a predetermined value, there appears at the output port 23 a fluid pressure having the same value as this throttle fluid pressure, but, when the throttle fluid pressure Pth is above this predetermined value, then the pressure at the output port 23 remains at this predetermined value, by the action of the valve element 20. This fluid pressure at the output port 23 will be called "throttle modulator fluid pressure", and it is related to engine load as shown in FIG. 4, by modifying part of the solid line T to the broken line T'. In other words, the throttle modulator fluid pressure rises from substantially zero pressure at zero engine load to a predetermined value equal to throttle pressure at a predetermined value of engine load, and, as engine load increases thencefrom, remains constant at this predetermined value.

Via a fluid passage 36, this throttle modulator fluid pressure appearing at the output port 23 of the first pressure modulator valve 18 is fed to an input port 35 of the second fluid pressure modulator valve 19.

The second fluid pressure modulator valve 19 is constructed similarly to the first fluid pressure modulator valve 18, except that an additional pressure biasing chamber is provided at its lower part in the drawing, in which the compression coil spring 37 is located. In more detail, the line pressure Pl is fed through a fluid conduit 32 to an input port 30 of the second fluid pressure modulator valve 19 from the fluid pressure control circuit 4, and is communicated from this input port 30 to an output port 31. The pressure appearing at the output port 31 is, in a fashion similarly to the operation of the first fluid pressure modulator valve 18, fed back through a fluid passage 33 to a biasing port 34 of the second fluid pressure modulator valve 19, through which it enters to a chamber above the valve element 28 in the drawing, so as to bias the valve element 28 downwards in the drawing. The valve element 28 is biased upwards in the drawing, not only by the compression force of the compression coil spring 37, but also by the throttle modulator fluid pressure which is supplied to the aforementioned port 35. A land portion 29 formed on the valve element 28 controls the communication between the input port 30 and the output port 31.

Thereby, with this construction, there appears at the port 31 a fluid pressure which is obtained by proportionally modifying the line fluid pressure Pl supplied to the input port 30 by the throttle modulator fluid pressure which is supplied to the port 35. In this embodiment it is so arranged, by correctly designing the first and second fluid pressure modulator valves 18 and 19, that the line fluid pressure, which has the characteristics shown by the solid line L in FIG. 4 with relation to engine load, is modified so as to have a characteristic such as shown by the broken lines M and N in FIG. 4. However, because of course the line fluid pressure L cannot in fact be increased by such a modification, in fact the intermediate portion of the line showing the fluid pressure appearing at the output port 31 of the second fluid pressure modulator valve 19 is as shown in FIG. 4 by the intermediate portion of the solid line L. In other words, the performance of the fluid pressure appearing at the port 31, with relation to engine load, is as shown by the line M-L-N in FIG. 4, i.e. is convex upwards, and is more similar to the characteristic of engine torque against engine load, than is a straight line.

Accordingly, when this fluid pressure appearing at the output port 31 is fed to the back pressure chamber 16 of the back pressure accumulator 11 via the fluid conduit 38, as shown in FIG. 3, then the characteristic of the torque transmission ability of the friction engaging mechanism, with relation to engine load, at the beginning of operation of the accumulator, and at the end of operation of the accumulator, i.e., the lines A and B in FIG. 1, are modified as shown by the broken lines in that figure. In other words, the torque transmission ability of the friction engaging mechanism 3 is reduced in the region of low engine load, and also in the region of high engine load, so that the characteristic as a whole is somewhat convex upwards. Thus, as will be immediately seen from the figure, according to this modification, the torque transmission ability of the friction engaging mechanism 3 is much better suited, over the total range of engine load from 0% to 100%, to the torque production characteristic of the engine of the vehicle. In particular, referring now to FIG. 2, which shows the process of changing gear speed stage during the 100% engine load condition, the torque transmission ability characteristic of the friction engaging mechanism 3 is corrected from the solid line AA-BB-CC to that shown by the broken line AA'-BB'-CC'. Accordingly, the time point at which the friction engaging mechanism 3 starts to engage is shown by the point f, which now is not on the line AA', but is on the line BB'. Accordingly, the gear shift shock at this time is reduced to acceptable proportions, due to the fact that the starting of the engagement of the friction engaging mechanism 3 occurs during the operation of the accumulator 11.

Further, the time point g shows the time of finishing of the engagement of the friction engaging mechanism 3. The time interval $t_2$ between the time points f and g, i.e. the time interval taken for the friction engaging mechanism 3 to become fully engaged from the state when it is first slightly engaged, is considerably longer, than was the time interval $t_1$ according to the prior art. Thereby, the gear shifting of the automatic transmission is performed much more smoothly and progressively than was the case in the prior art construction outlined above, and little or no gear shift shock occurs.

Figure 2:
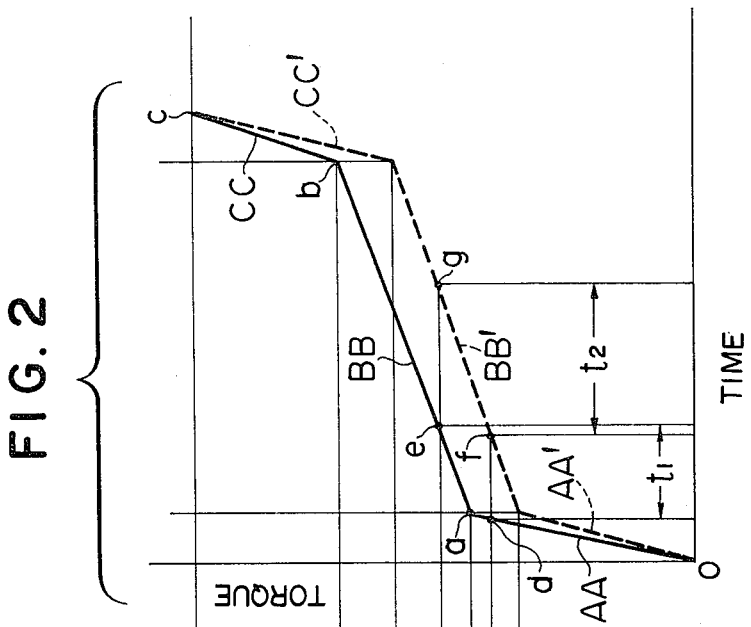
FIG. 2 is a graph, in which time is the abscissa and torque is the ordinate, showing, under the assumption that engine load is maximum or 100%, the time variation of torque transmission ability of a friction engaging device, during a period of engagement thereof.

A similar beneficial effect to that shown in FIG. 2 also occurs in the region of low engine load, as well as in the region of high engine load as shown in FIG. 2. In fact, by the suitable conforming of the shapes of the characteristics A and B in FIG. 1 to the shapes of the characteristics B and E, a smooth and good transmission engagement and changing of gear speed stage is ensured throughout the entire range of engine load, from 0% to 100%.

Although the present invention has been shown and described in terms of a preferred embodiment thereof, and in language more or less specific with regard to structural features thereof, and with reference to the illustrative drawings, it should be understood that in any particular embodiment of the present invention various changes, modifications, and omissions of the form and the detail thereof could be made by a person skilled in the art, without departing from the essential scope of the invention. Therefore, it is expressly desired that the scope of the present invention should be uniquely delimited by the legitimate and valid scope of the appended claims, which follow, and not by any of the perhaps purely fortuitous details of the shown embodiment, or of the drawings.

We claim:

1. For an automatic transmission for an engine powered vehicle, comprising:
    a gear transmission mechanism and a plurality of fluid pressure actuated friction engaging mechanisms, a plurality of speed stages being provided by said gear transmission mechanism according to selective actuation of said friction engaging mechanisms;
    a fluid pressure control system comprising:
    (a) a line fluid pressure control valve which produces a line fluid pressure which increases from a predetermined base pressure by an amount approximately proportional to the degree of a throttle opening representative of engine load;
    (b) a throttle fluid pressure control valve which produces a throttle fluid pressure which is approximately proportional to the degree of said throttle opening;
    (c) a shift valve which receives supply of said line fluid pressure and which selectively supplies it according to the operational conditions of the vehicle;
    (d) a fluid pressure passage which receives said selective supply of fluid pressure from said shift valve and which conducts it to one of said friction engaging mechanisms;
    (e) an accumulator comprising an accumulator chamber and a back pressure chamber, the accumulator chamber being connected so as to accumulate fluid from an intermediate point on said passage; and
    (f) a means for controlling fluid pressure, comprising:
    a first fluid pressure modulation valve which comprises a first bore;
    a first valve element slidably mounted within said first bore;
    a first input port opening in said first bore;
    a first output port, opening in said first bore, communication of which with said first input port is established when said first valve element is positioned beyond a first point in a first direction within said first bore, and communication of which to said first input bore is interrupted when said first valve element is positioned beyond said first point in the direction opposite to said first direction within said first bore;
    a first compression coil spring biasing said first valve element in said first direction; and
    a first biasing chamber, supply of fluid pressure to which biases said first valve element in the direction opposite to said first direction; said throttle fluid pressure being supplied to said first input port, and a throttle modulator fluid pressure being taken out from said first output port and also being fed therefrom to said first biasing chamber; and
    a second fluid pressure modulation valve which comprises:
    a second bore;
    a second valve element slidably mounted within said second bore;
    a second input port opening in said second bore;
    a second output port, opening in said second bore, communication of which with said second input port is established when said second valve element is positioned beyond a second point in a second direction within said second bore, and communication of which to said second input port is interrupted when said second valve element is positioned beyond said second point in the direction opposite to said second direction within said second bore;
    a second compression coil spring biasing said second valve element in said second direction;
    a second biasing chamber, supply of fluid pressure to which biases said second valve element in the direction opposite to said second direction; and
    a third biasing chamber, supply of fluid pressure to which biases said second valve element in said second direction; said line fluid pressure being supplied to said second input port, said throttle modulator fluid pressure being supplied to said third biasing chamber, and an output fluid pressure of said fluid pressure control means being taken out from said second output port and also being fed therefrom to said second biasing chamber;
    wherein structural parameters of said first and second fluid pressure modulation valves are so determined that, in a first range the degree of throttle opening between zero opening and a relatively small intermediate opening said output fluid pressure is lower than said line fluid pressure and increases more rapidly than said line fluid pressure as said throttle opening increases so as to become the same as said line fluid pressure when the throttle opening reaches the upper limit of said first range of throttle opening, in a second range the degree of throttle opening between a relatively large intermediate opening and full opening, said output fluid pressure is lower than said line fluid pressure and is substantially constant regardless of said throttle opening so as to be the same level as the line fluid pressure at the lower limit of said throttle opening in said second range, and in a third range the degree of throttle opening between said first range and said second range said output fluid pressure is the same as said fluid line pressure.

* * * * *